United States Patent
Wu et al.

(10) Patent No.: US 10,992,978 B2
(45) Date of Patent: Apr. 27, 2021

(54) METHOD AND SYSTEM FOR CONTROLLING SMART TELEVISION

(71) Applicant: Huizhou TCL Mobile Communication Co., Ltd., HuiZhou (CN)

(72) Inventors: Zhaoyun Wu, HuiZhou (CN); Huixin Wang, HuiZhou (CN); Shengpeng Liao, HuiZhou (CN); Xinyao Ye, HuiZhou (CN); Yajun Hu, HuiZhou (CN); Longquan Yuan, HuiZhou (CN); Weilong Zhou, HuiZhou (CN); Hao Sun, HuiZhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 135 days.

(21) Appl. No.: 16/469,078

(22) PCT Filed: Dec. 7, 2017

(86) PCT No.: PCT/CN2017/115062
§ 371 (c)(1),
(2) Date: Jun. 12, 2019

(87) PCT Pub. No.: WO2018/108025
PCT Pub. Date: Jun. 21, 2018

(65) Prior Publication Data
US 2020/0084494 A1    Mar. 12, 2020

(30) Foreign Application Priority Data
Dec. 13, 2016  (CN) .......................... 201611147003.3

(51) Int. Cl.
*H04N 21/41* (2011.01)
*H04L 29/08* (2006.01)
(Continued)

(52) U.S. Cl.
CPC ....... *H04N 21/4126* (2013.01); *H04L 67/147* (2013.01); *H04N 21/42204* (2013.01); *H04N 21/43637* (2013.01); *H04W 8/24* (2013.01)

(58) Field of Classification Search
CPC ....... H04W 4/80; H04W 76/14; H04W 76/10; H04W 76/19; H04W 4/06; H04W 8/24;
(Continued)

(56) References Cited

U.S. PATENT DOCUMENTS

2016/0198327 A1    7/2016  Park et al.
2016/0234301 A1*   8/2016  Qi .......................... H04W 8/005
(Continued)

FOREIGN PATENT DOCUMENTS

CN    103561281 A       2/2014
CN    105141706 A  *   12/2015
(Continued)

OTHER PUBLICATIONS

Xia Hua, CN-105141706-A Translation, Dec. 2015 (Year: 2015).*
(Continued)

*Primary Examiner* — Nizar N Sivji
(74) *Attorney, Agent, or Firm* — Kirton McConkie; Evan R. Witt

(57) ABSTRACT

A method for controlling a smart television is disclosed. The method includes establishing a WiFi Aware connection with a mobile terminal when the smart television receives a subscription request of the mobile terminal; and sending a message by the mobile terminal to the smart television through the WiFi Aware connection to control the smart television.

15 Claims, 1 Drawing Sheet

--- establishing a WiFi Aware connection with a mobile terminal when the smart television receives a subscription request of the mobile terminal — S100 sending a message by the mobile terminal to the smart television through the WiFi Aware connection to control the smart television — S200

(51) Int. Cl.
*H04N 21/422* (2011.01)
*H04N 21/4363* (2011.01)
*H04W 8/24* (2009.01)

(58) Field of Classification Search
CPC ..... H04L 67/104; H04L 67/14; H04L 67/147; H04N 5/232; H04N 21/4126; H04N 21/42204; H04N 21/43637; H04N 21/42206; G08C 17/02; G08C 2201/93; G08C 17/00
See application file for complete search history.

(56) References Cited

U.S. PATENT DOCUMENTS

| | | | | |
|---|---|---|---|---|
| 2016/0234758 | A1* | 8/2016 | Qi | H04W 40/246 |
| 2018/0114045 | A1* | 4/2018 | Ebrahimi | G06K 7/1417 |
| 2018/0373304 | A1* | 12/2018 | Davis | H01H 47/325 |
| 2020/0050753 | A1* | 2/2020 | Davis | G08C 17/02 |

FOREIGN PATENT DOCUMENTS

| | | |
|---|---|---|
| CN | 105141706 A | 12/2015 |
| CN | 106603944 A | 4/2017 |

OTHER PUBLICATIONS

A New Simple Wi-Fi Direct Connection Method using NFC on Remote Control and DTV (Year: 2014).*
Collaborative Streaming-based Media Content Sharing in WiFi-enabled Home Networks (Year: 2010).*

* cited by examiner

METHOD AND SYSTEM FOR CONTROLLING SMART TELEVISION

TECHNICAL FIELD OF THE INVENTION

The present invention relates to a field of WiFi Aware technology, and more particularly to a method and a system for controlling a smart television.

BACKGROUND OF THE INVENTION

With the continuous development of mobile terminals, terminal devices such as mobile phones or tablets have become the user's portable control center. The users cannot only socialize through it, but also control homes, cars, etc. through terminal devices to realize remote control functions.

At present, smart televisions are used in more and more families. When users want to switch channel, they must use the remote control. However, the remote control based on infrared transmission must be operated at a close distance, and the infrared remote control has the disadvantages of poor anti-interference and poor stability, and when the terminal part has a favorite movie, it cannot be shared into the television, so the existing remote control based on infrared transmission cannot meet the needs of contemporary users.

SUMMARY OF THE INVENTION

An objective of the present invention is to provide a method and a system for controlling a smart television, which aims to solve the problems that an existing method for controlling a smart television has issues of short operation distance, poor anti-interference, poor stability and inability to share resources with mobile terminals.

The technical solution of the present invention is described as follows:

a method for controlling a smart television, comprising steps of:

establishing a WiFi Aware connection with a mobile terminal when the smart television receives a subscription request of the mobile terminal;

sending a message by the mobile terminal to the smart television through the WiFi Aware connection to control the smart television.

Preferably, in the method for controlling the smart television, a step of establishing the WiFi Aware connection with the mobile terminal when the smart television receives the subscription request of the mobile terminal comprises:

launching and releasing a WiFi Aware service by the smart television;

sending the subscription request of the WiFi Aware service to the smart television after the mobile terminal searches for the smart television; and establishing the WiFi Aware connection with the mobile terminal when the smart television receives the subscription request of the WiFi Aware service of the mobile terminal.

Preferably, in the method for controlling the smart television, a step of sending the message by the mobile terminal to the smart television through the WiFi Aware connection to control the smart television comprises:

sending the message by the mobile terminal to the smart television through the WiFi Aware connection;

parsing the received message and providing corresponding feedback based on a parsing result by the smart television.

Preferably, in the method for controlling the smart television, a step of parsing the received message and providing the corresponding feedback based on the parsing result by the smart television comprises:

directly controlling the smart television according to a control instruction when the smart television parses the received message into the control instruction;

establishing a WiFi Direct connection with the mobile terminal and receiving file data sent by the mobile terminal when the smart television parses the received message into a file sending service.

Preferably, in the method for controlling the smart television, after a step of parsing the received message and providing the corresponding feedback based on the parsing result by the smart television, the method further comprises:

updating an UI (user interface) of the smart television when the smart television successfully receives the file data.

A system for controlling a smart television, comprising the smart television and a mobile terminal, wherein the smart television is configured to receive a subscription request of the mobile terminal and to establish a WiFi Aware connection with the mobile terminal; and the mobile terminal is configured to send a message to the smart television through the WiFi Aware connection to control the smart television.

Preferably, in the method for controlling the smart television, the smart television is configured to activate and release a WiFi Aware service; and the smart television is configured to establish the WiFi Aware connection with the mobile terminal when receiving a subscription request of the WiFi Aware service of the mobile terminal; the mobile terminal is configured to send the subscription request of the WiFi Aware service to the smart television after searching for the smart television.

Preferably, in the method for controlling the smart television, the mobile terminal is configured to send message to the smart television through the WiFi Aware connection; the smart television is configured to parse the received message and to provide corresponding feedback based on a parsing result.

Preferably, in the method for controlling the smart television, the smart television is configured to directly control the smart television according to a control instruction when the received message is parsed into the control instruction; and the smart television is configured to establish a WiFi Direct connection with the mobile terminal and to receive file data sent by the mobile terminal when the received message is parsed into a file sending service.

Preferably, in the method for controlling the smart television, the smart television is further configured to update an UI of the smart television when successfully receiving the file data.

The present invention further provides a method for controlling a smart television, comprising steps of:

performing an initialization of a WiFi Aware service, and then releasing the WiFi Aware service when the smart television is activated;

sending the subscription request of the WiFi Aware service to the smart television after the mobile terminal searches for the smart television; and establishing the WiFi Aware connection with the mobile terminal when the smart television receives the subscription request of the WiFi Aware service of the mobile terminal;

sending a message by the mobile terminal to the smart television through the WiFi Aware connection to control the smart television.

Preferably, in the method for controlling the smart television, a step of sending the message by the mobile terminal to the smart television through the WiFi Aware connection to control the smart television comprises:

sending the message by the mobile terminal to the smart television through the WiFi Aware connection;

parsing the received message and providing corresponding feedback based on a parsing result by the smart television.

Preferably, in the method for controlling the smart television, a step of parsing the received message and providing the corresponding feedback based on the parsing result by the smart television comprises:

directly controlling the smart television according to a control instruction when the smart television parses the received message into the control instruction;

establishing a WiFi Direct connection with the mobile terminal and receiving file data sent by the mobile terminal when the smart television parses the received message into a file sending service.

Preferably, in the method for controlling the smart television, after a step of parsing the received message and providing the corresponding feedback based on the parsing result by the smart television, the method further comprises:

updating an UI of the smart television when the smart television successfully receives the file data.

The benefits of the present invention are: the present invention controls various operations of a smart television device through a mobile terminal, including file operations, channel selection, video sharing, and etc. based on WiFi Aware technology; the smart television realizes the user operation after receiving the control instruction sent by the mobile terminal through the WiFi Aware; meanwhile, if the user has a movie/video/file, etc. in the mobile terminal device, it can also be sent to the television for playing and viewing through the traditional WiFi Direct connection. This does not only facilitate the user operation, but also provides a better large-screen operation experience and also solves the problem of poor interference, poor stability, and short controllable distance of the conventional infrared control.

DETAILED DESCRIPTION OF THE INVENTION

The present invention provides a method and a system for controlling a smart television. For making the objectives, technical solutions and effects of the present invention more clear and definite, the present invention will be further described in detail below. It should be noted that the specific embodiments described herein are merely for explaining the present invention and are not intended to limit the present invention.

Figure 1:
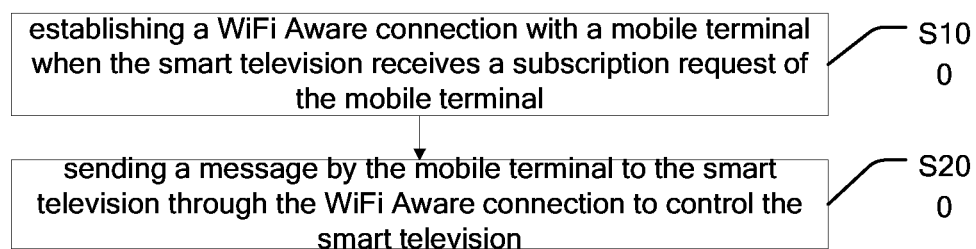
FIG. 1 is a flowchart of a method for controlling a smart television according to the preferred embodiment of the present invention.

Please refer to FIG. 1. FIG. 1 is a flowchart of a method for controlling a smart television based on WiFi Aware technology according to the preferred embodiment of the present invention. As shown in figure, the method comprises steps of:

S100, establishing a WiFi Aware connection with a mobile terminal when the smart television receives a subscription request of the mobile terminal;

S200, sending a message by the mobile terminal to the smart television through the WiFi Aware connection to control the smart television.

Specifically, the main objective of the embodiment of the present invention is to provide a method for controlling a smart television, which solves the problems of poor anti-interference, poor stability, and short controllable distance in the prior art by using an infrared remote controller to control a smart television.

To solve this problem, the present invention controls various operations of a smart television through a mobile terminal based on WiFi Aware technology. Specifically, a WiFi Aware connection with a mobile terminal is first established when the smart television receives a subscription request of the mobile terminal; then, the mobile terminal sends a message to the smart television through the WiFi Aware connection to control various operations of the smart television.

Namely, the present invention realizes various operations of controlling the smart television through the mobile terminal. The present invention possesses various advantages, such as long control distance, strong anti-interference and strong stability in comparison with a conventional infrared remote controller.

Furthermore, in the present invention, Step S100 specifically comprises:

S110, launching and releasing a WiFi Aware service by the smart television;

specifically, after the smart television is activated, an initialization of a WiFi Aware service is first performed, and then the WiFi Aware service is released to provide a subscription to potential mobile terminals;

S120, sending the subscription request of the WiFi Aware service to the smart television after the mobile terminal searches for the smart television; and specifically, after the mobile terminal is activated, the initialization of UI is first performed, and then the mobile terminal automatically searches for nearby smart devices, such as smart televisions, smart refrigerators, smart air conditioners, etc. If the user wants to control the smart television through the mobile terminal and after the activation of the smart television is detected, the subscription request of the WiFi Aware service is sent to the smart television for requesting to establish the WiFi Aware connection with the smart TV;

S130, establishing the WiFi Aware connection with the mobile terminal when the smart television receives the subscription request of the WiFi Aware service of the mobile terminal.

Specifically, WiFi Aware possesses advantages of stable signal, low power consumption and high efficiency. When the smart television establishes a WiFi Aware connection with the mobile terminal, information transmission between the two can be realized.

Furthermore, in the present invention, Step S200 specifically comprises:

S210, sending the message by the mobile terminal to the smart television through the WiFi Aware connection;

specifically, after the smart television establishes the WiFi Aware connection with the mobile terminal, the smart television is in a state for receiving data; and is ready to receive messages sent by the mobile terminal through WiFi Aware;

S220, parsing the received message and providing corresponding feedback based on a parsing result by the smart television.

Specifically, after the smart television receives the message sent from the mobile terminal, the smart television processes and parses the message and realizes user operation based on the parsing result; preferably, Step S220 specifically comprises:

S221, directly controlling the smart television according to a control instruction when the smart television parses the received message into the control instruction;

namely, when the smart television parses the received message into the control instruction, for instance, switching channel of the smart television and increasing volume of the smart television, the smart television responds to the control instruction from the mobile terminal.

S222, establishing a WiFi Direct connection with the mobile terminal and receiving file data sent by the mobile terminal when the smart television parses the received message into a file sending service.

Namely, when the user wants to play some large files stored in the mobile terminal on the smart television, such as video, music and etc., the mobile terminal needs to establish the WiFi Direct connection with the smart television, and then to send a corresponding large file data to the smart television through a local area network communication before the subsequent viewing operation can be performed.

Furthermore, when the smart television parses the received message into a file sending service, the UI initialization of the smart television is first performed, and the UI initialization is to convert an interface of the smart television into a file receiving interface; after the smart television establishes the WiFi Direct connection with the mobile terminal, the smart television starts to receive the file data sent by the mobile terminal;

furthermore, after the smart television successfully receives the file data, the UI of the smart television is updated. Namely, after the smart television successfully receives the file data, the UI of the smart television changes. For instance, the successfully received file is displayed on the interface of the smart television in a form of an icon.

Furthermore, when the user wants to view the received file content on the smart television, the user needs to send a play instruction through the mobile terminal, thereby controlling the smart television to play the file content.

the present invention does not only overcome the problems of poor interference, poor stability and short controllable distance of the conventional infrared control, but also can transmit files (such as movie, video and music) stored in the mobile terminal to the television for playing and viewing through the traditional WiFi Direct connection, which is convenient for user operation and provides a better large-screen operation experience.

Figure 2:
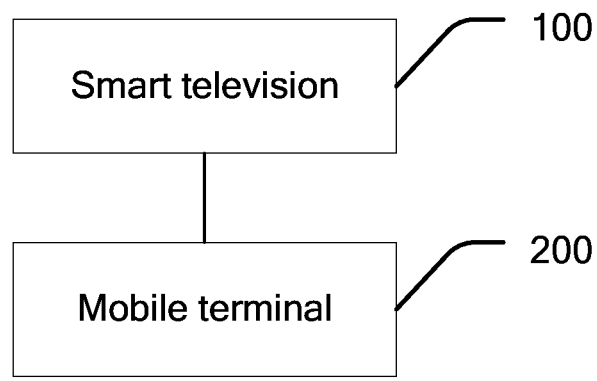
FIG. 2 is a structure block diagram of a system for controlling a smart television according to the preferred embodiment of the present invention.

Based on the foregoing method, the present invention further provides a system for controlling a smart television. As shown in FIG. 2, the system comprises a smart television 100 and a mobile terminal 200. The smart television 100 is configured to receive a subscription request of the mobile terminal and to establish a WiFi Aware connection with the mobile terminal; and the mobile terminal 200 is configured to send a message to the smart television through the WiFi Aware connection to control the smart television.

Preferably, in the method for controlling the smart television, the smart television 100 is specifically configured to activate and release a WiFi Aware service; and the smart television is configured to establish the WiFi Aware connection with the mobile terminal when receiving a subscription request of the WiFi Aware service of the mobile terminal; the mobile terminal is specifically configured to send the subscription request of the WiFi Aware service to the smart television after searching for the smart television.

Preferably, in the method for controlling the smart television, the mobile terminal 200 is specifically configured to send message to the smart television through the WiFi Aware connection; the smart television 100 is specifically configured to parse the received message and to provide corresponding feedback based on a parsing result.

Preferably, in the method for controlling the smart television, the smart television 100 is specifically configured to directly control the smart television according to a control instruction when the received message is parsed into the control instruction; and the smart television is configured to establish a WiFi Direct connection with the mobile terminal and to receive file data sent by the mobile terminal when the received message is parsed into a file sending service.

Preferably, in the method for controlling the smart television, the smart television 100 is further configured to update an UI of the smart television when successfully receiving the file data.

In conclusion, the present invention controls various operations of a smart television device through a mobile terminal, including file operations, channel selection, video sharing, and etc. based on WiFi Aware technology; the smart television realizes the user operation after receiving the control instruction sent by the mobile terminal through the WiFi Aware; meanwhile, if the user has a movie/video/file, etc. in the mobile terminal device, it can also be sent to the television for playing and viewing through the traditional WiFi Direct connection. This does not only facilitate the user operation, but also provides a better large-screen operation experience and also solves the problem of poor interference, poor stability, and short controllable distance of the conventional infrared control.

It should be understood that the application of the present invention is not limited to the foregoing illustrations, and those skilled in the art can make modifications or changes in accordance with the foregoing description, all of which are within the scope of the appended claims.

What is claimed is:
1. A method for controlling a smart television, comprising steps of:
  launching and releasing a WiFi Aware service by the smart television;
  establishing a WiFi Aware connection with a mobile terminal when the smart television receives, from the mobile terminal, a subscription request of the WiFi Aware service;
  receiving a message by the smart television from the mobile terminal through the WiFi Aware connection, wherein the message is configured to control the smart television;
  parsing the received message;
  controlling the smart television according to a control instruction when the smart television parses the received message into the control instruction; and
  establishing a peer to peer wireless connection with the mobile terminal and receiving file data sent by the mobile terminal through the peer to peer wireless connection when the smart television parses the received message into a file sending service,
  wherein the file data comprises playable content, and the controlling the smart television according to a control instruction comprises:

playing the file data in response to a play instruction sent from the mobile terminal.

2. The method for controlling the smart television according to claim 1, wherein the controlling the smart television according to a control instruction comprises: controlling at least one of volume adjustment, channel selection, and video sharing associated with the smart television.

3. The method for controlling the smart television according to claim 1, wherein the peer to peer wireless connection comprises a WiFi Direct connection with the mobile terminal.

4. The method for controlling the smart television according to claim 1, wherein the method further comprises: updating an UI (user interface) of the smart television when the smart television successfully receives the file data.

5. The method for controlling the smart television according to claim 1, wherein the file data comprises a video file or a music file.

6. A television system, comprising:
a smart television; and
a mobile terminal, wherein the smart television is configured to activate and release a WiFi Aware service, receive a subscription request of the WiFi Aware service from the mobile terminal and to establish a WiFi Aware connection with the mobile terminal in response to the subscription request of the WiFi Aware service; and the mobile terminal is configured to send a message to the smart television through the WiFi Aware connection to control the smart television;
wherein the smart television is configured to parse the received message;
wherein the smart television controls one or more functions of the smart television according to a control instruction when the smart television parses the received message into the control instruction; and
wherein the smart television establishes a peer to peer wireless connection with the mobile terminal and receives file data sent by the mobile terminal through the peer to peer wireless connection when the smart television parses the received message into a file sending service, wherein the file data comprises playable content, and the smart television plays the file data in response to a play instruction sent from the mobile terminal.

7. The system for controlling the smart television according to the claim 6, wherein the smart television controls at least one of volume adjustment, channel selection, and video sharing associated with the smart television according to the control instruction.

8. The system for controlling the smart television according to the claim 6, wherein the peer to peer wireless connection comprises a WiFi Direct connection with the mobile terminal.

9. The system for controlling the smart television according to the claim 6, wherein the smart television is further configured to update an UI of the smart television when successfully receiving the file data.

10. The television system according to claim 6, wherein the file data comprises a video file or a music file.

11. A method for controlling a smart television, comprising steps of:
sending by a mobile terminal a subscription request of a WiFi Aware service to the smart television after the mobile terminal searches for the smart television; and
establishing a WiFi Aware connection between the smart television and the mobile terminal for the subscription request of the WiFi Aware service of the mobile terminal;
sending a message by the mobile terminal to the smart television through the WiFi Aware connection to control one or more functions of the smart television, wherein the message comprises a control instruction;
establishing a peer to peer wireless connection between the smart television and the mobile terminal for a file sharing function among one or more functions of the smart television; and
performing the file sharing function by transmitting file data by the mobile terminal through the peer to peer wireless connection to the smart television, wherein the file data comprises playable content, and the smart television plays the file data in response to a play instruction sent from the mobile terminal.

12. The method for controlling the smart television according to claim 11, further comprising:
sending a play instruction by the mobile terminal to the smart television to playing the file data on the television.

13. The method for controlling the smart television according to claim 11, wherein the peer to peer wireless connection comprises a WiFi Direct connection between the smart television and the mobile terminal.

14. The method for controlling the smart television according to claim 11, further comprising: wherein the one or more functions of the smart television comprise at least one of volume adjustment, channel selection, and video sharing associated with the smart television.

15. The method for controlling the smart television according to claim 11, wherein the file data comprises a video file or a music file.

* * * * *